J. G. FAHR.
MOWING MACHINE.
APPLICATION FILED DEC. 16, 1909.
992,347.
Patented May 16, 1911.
3 SHEETS—SHEET 2.
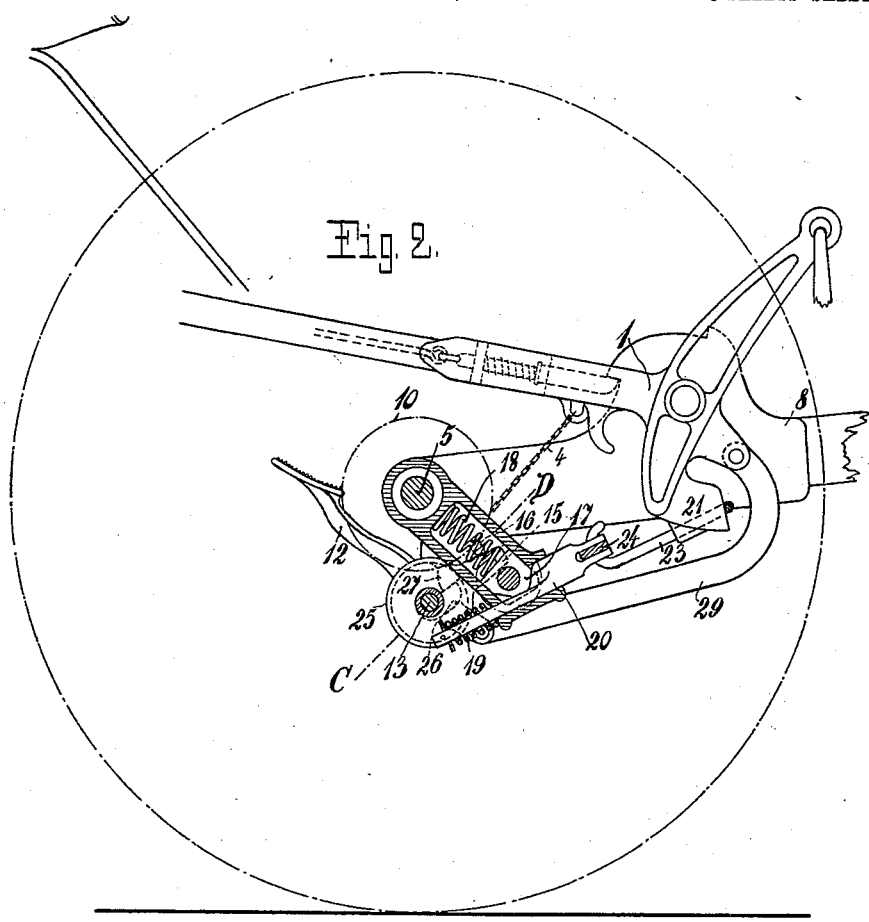
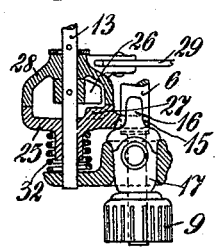 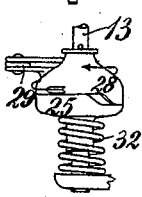 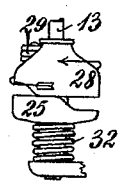
Witnesses
E. Schallinger
J. Rabinowitz
Inventor
Johann Georg Fahr
by B. Singer
Atty.

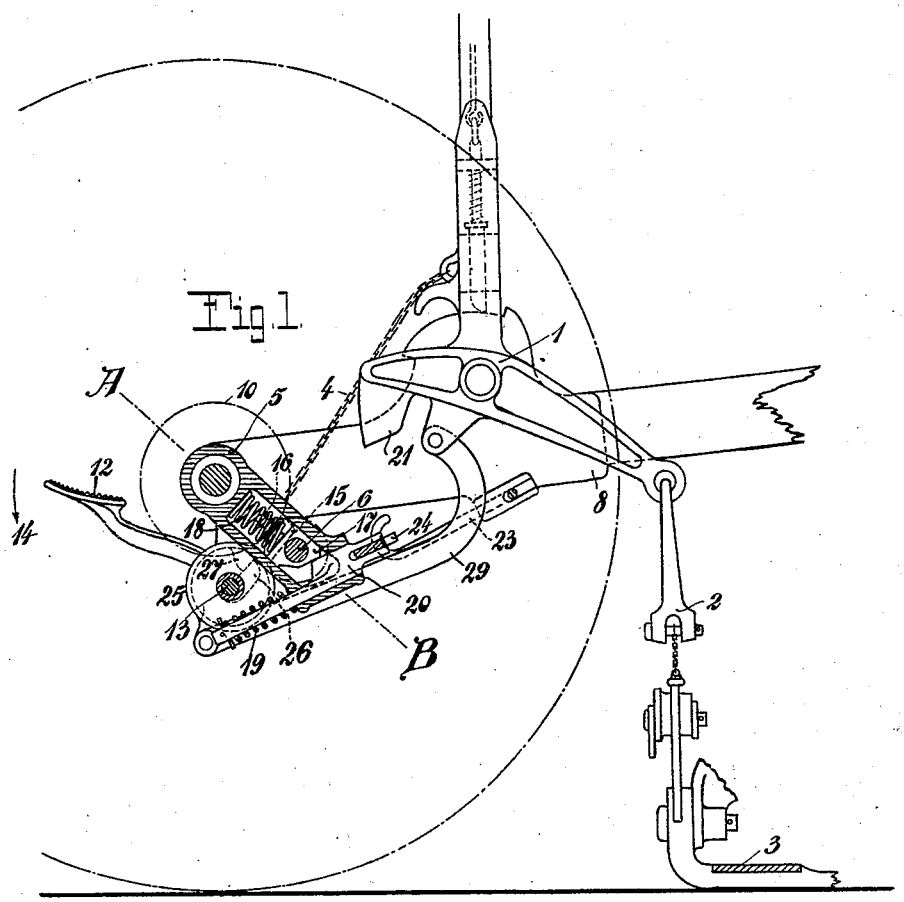

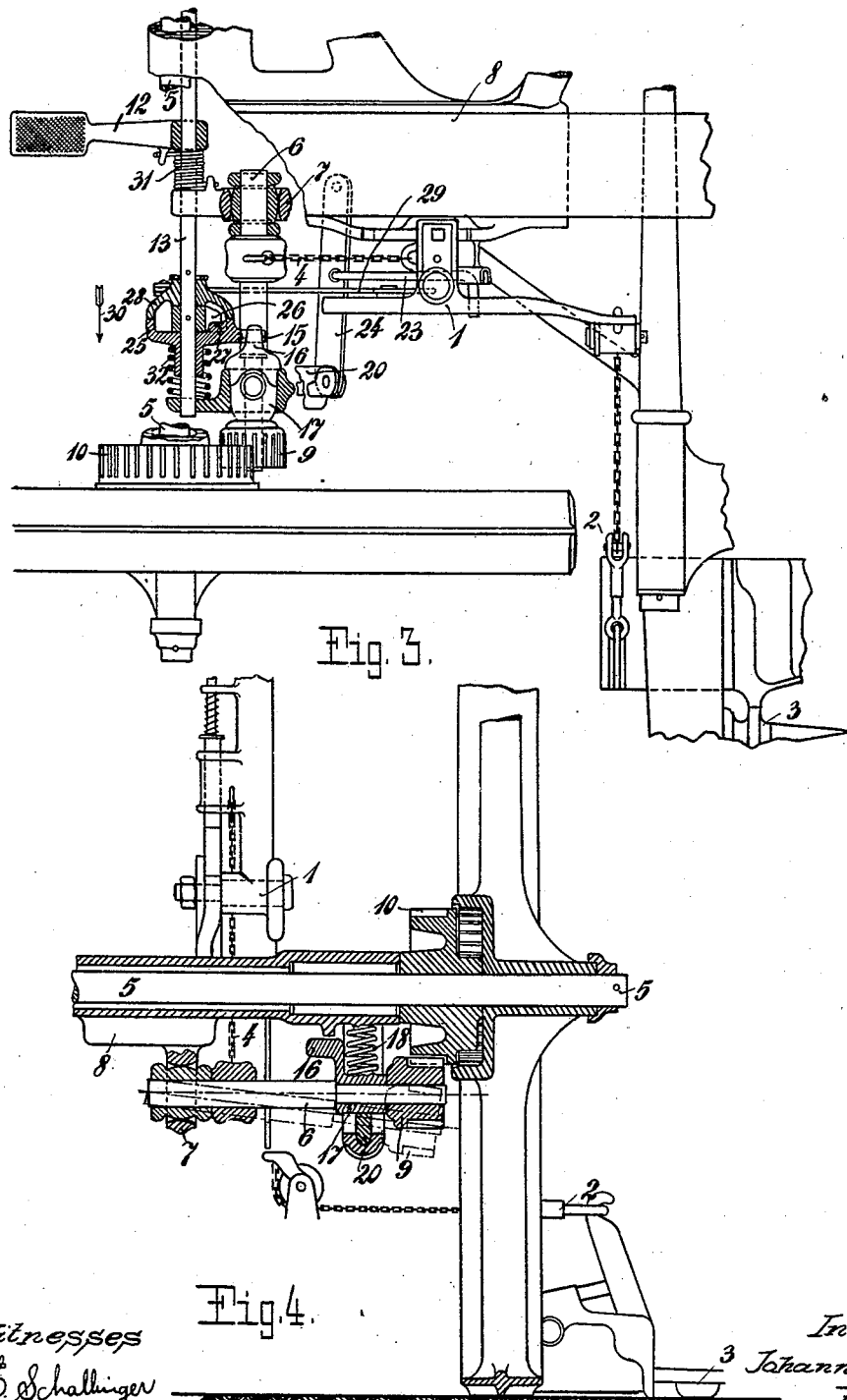

UNITED STATES PATENT OFFICE.

JOHANN GEORG FAHR, OF GOTTMADINGEN, GERMANY.

MOWING-MACHINE.

992,347.    Specification of Letters Patent.    Patented May 16, 1911.

Application filed December 16, 1909. Serial No. 533,433.

*To all whom it may concern:*

Be it known that I, JOHANN GEORG FAHR, a citizen of the German Empire, residing at Gottmadingen, in the Grand Duchy of Baden, Germany, have invented certain new and useful Improvements in Mowing-Machines, of which the following is a specification.

My invention relates to harvesters, reapers, mowers and the like having cutters which can be lifted and swung.

Whereas in harvesters known heretofore a considerable exertion of force by the driver was required for lifting the cutter bar, in my improved harvester I derive the lifting motion of the cutter bar from the traveling motion of the machine. Owing to this improved arrangement exertion of power on the part of the driver is saved and capability of maneuvering is considerably increased. I preferably derive the motion of the cutter bar from the rotation of the track wheels with the intermediacy of a detachable clutch. Since no considerable exertion of force is necessary for lowering the bar this may be done without the aid of motive power especially so much the more as a reversal of the direction of the driving power would be necessary. I therefore preferably provide that the connection between the cutter bar and gearing is done away with when the bar is lowered.

In the accompanying drawing one preferred form of a harvester according to my invention is represented by way of example, some parts not necessary for the explanation of the invention having been omitted.

In said drawings:—Figures 1 and 2 are side elevations partly in section, Fig. 3 is a top plan view, partly in section, Fig. 4 a section in the plane A—B in Fig. 1, Fig. 5 a section in the plane C—D in Fig. 2, and Figs. 6 and 7 are side elevations of details represented in section in Figs. 3 and 5. Fig. 1 shows the machine as the cutter bar commences to move upward after the automatic lifting mechanism has been thrown into gear, whereas Fig. 2 shows the position of the parts when the cutter bar has been swung up after the automatic driving gearing has been disconnected. Fig. 3 shows the parts of the gearing ready for operation before the clutch is thrown into gear, Fig. 5 the same parts after connection of the clutch, whereas Fig. 4 illustrates in full lines the parts in the same position as Fig. 1, namely when the clutch is connected. Figs. 6 and 7 show details of the lifting mechanism.

Referring to the drawings, the lifting lever 1, to which is connected in well-known manner the lifting rod 2 for moving cutter bar 3, has attached to it in the illustrative embodiment a chain or other draft member 4 leading to a shaft 6. This shaft is mounted to rock in such manner in its one bearing 7 on the machine frame 8 that it can be swung upwardly, against the pressure of spring 18, into a position shown in full lines in Fig. 4, parallel to the axle 5 from its slanting normal position shown in dotted lines in Fig. 4, whereby it becomes coupled by the gear wheels 9, 10 with the wheel axle 5. When this main axle rotates chain 4 is wound up on shaft 6 whereby the lifting lever is drawn down and cutter bar 3 swung up. Shaft 6 is thrown into and out of gear as follows:— When the driver depresses foot lever 12 secured on shaft 13 said lever is moved into the position shown in Fig. 1 rotating shaft 13 in the direction of arrow 14. An arm 15 is lifted by shaft 13 and acts under a corresponding projection 16 of the movable bearing 17 of shaft 6 arranged to swing in frame 8, lifts shaft 6 into its operative position (Figs. 1 and 4) and causes pinion 9 to mesh with the driving gear wheel 10. This upper position of shaft 6 necessary for driving the cutter bar 3 is secured for the duration of the swinging movement by a bolt 20 under the action of coil spring 19 moving under bearing 17 and securing this in its upper position (Fig. 1) immediately after shaft 6 has been lifted. Consequently, immediately after the lifting mechanism for the cutter bar has been thrown into gear, the driver can release foot lever 12 without the lifting gear being disconnected. At the end of the swinging movement of cutter bar 3 (Fig. 2) the lifting gear is automatically disconnected. To this end, I provide on lever 1 a lug 21 which at the end of the swinging movement of the cutter bar coacts with the rods 23, 24 connected with bolt 20, withdraws these rods into the position shown in Fig. 2 and thereby removes bolt 20 from its locking position shown in Fig. 1. In consequence of the removal of bolt 20 spring 18 becomes operative and presses the end 17 of shaft 6 downwardly into the position shown in dotted lines in Fig. 4, whereby pinion 9 is disengaged from gear wheel 10. The cutter apparatus can then be lowered from its vertical position (Fig. 2) in known manner by means of lever 1 without there being any connection with the automatic lifting gear.

If the foot lever 12 were rigidly permanently connected with arm 15 which causes shaft 6 to become coupled with shaft 5, the clutch would remain intact as long as the foot lever were depressed, even if bolt 20 were withdrawn at the end of the swinging movement of the cutter bar. Thus disturbances and fractures might occur if the foot lever were depressed too long. To avoid this, in the illustrative embodiment I do not connect arm 15 rigidly with shaft 13, but it forms a part of a disk 25 which is loose on shaft 13 and movable axially against the pressure of a spring 32. When shaft 13 rotates this disk 25 is driven by a driver or nose 26 attached to this shaft as long as a projection 27 on the disk is within reach of said driver. Adjacent disk 25 is arranged on shaft 13 a second loose disk 28 secured from axial displacement. The two abutting faces of the disk 25 and 28 are cam-shaped so that they can coact with one another corresponding to Figs. 6 and 7.

Disk 28 is connected by a tie member 29 with the lever 1 (Fig. 1) so that when the cutter bar swings up disk 28 is rotated around shaft 13 and in consequence of its cam face displaces disk 25 axially in the direction of arrow 30 on shaft 13. In consequence of this displacement driver 26 moves out of engagement with projection 27 of disk 25 as shown in Fig. 5. After the termination of the swinging movement and when the clutch has been unlocked, arm 15 can be rotated with disk 25 by spring 18 back into its original position, even if the foot lever has not yet been released. Disk 25 can return axially into its initial position (Fig. 3) under the action of spring 32, as soon as the foot lever has been released and has returned into its initial position together with shaft 13 and driver 26 under the action of spring 31, and as soon as disk 28 has been rotated back by arm 29. Driver 26 and projection 27 are then able to coact with one another again and ready for a renewed engagement of the clutch. The disconnection and connection of the cutter driving gear may be controlled by disk 28 arranged revolubly on shaft 13.

I claim:—

1. In a mowing-machine the combination with a traveling frame and an element moved by the traveling motion of the machine, of a cutter bar, a mechanism for lifting the cutter bar including a detachable clutch between the lifting mechanism and the said element, a lever for throwing said clutch into coupling position automatic locking means for holding the clutch in coupling position, means operated upon movement of the cutter bar for automatically releasing said locking means and automatic means for disconnecting the said lever from the clutch.

2. In a mowing machine the combination with a wheeled frame and a main axle, carrying a gear wheel, revoluble thereon, of a cutter bar, a mechanism for lifting the cutter bar including a rocking shaft carrying a pinion, a tie member attached to said mechanism and to said shaft, and lever-operated mechanism for rocking said shaft and causing said pinion to mesh with said gear wheel.

3. In a mowing machine the combination with a wheeled frame, and a main axle, carrying a gear wheel, revoluble thereon, of a lever pivoted in said frame, a cutter bar connected with said lever, a rocking shaft carrying a pinion, a tie member attached to said lever and to said shaft, lever-operated mechanism comprising a detachable clutch for rocking said shaft and causing said pinion to mesh with said gear wheel, and automatic locking means controlled by said lever for holding said pinion in engagement with said gear wheel.

4. In a mowing-machine the combination with a wheeled frame, and a main axle, carrying a gear wheel, revoluble thereon, of a lever pivoted in said frame, a cutter bar connected with said lever, a rocking shaft carrying a pinion, a tie member attached to said lever and to said shaft, lever-operated mechanism comprising a detachable clutch for rocking said shaft and causing said pinion to mesh with said gear wheel, automatic locking means controlled by said lever for holding said pinion in engagement with said gear wheel, and means controlled by said lever for automatically unlocking said locking means.

5. In a mowing-machine the combination with a wheeled frame, a main axle, carrying a gear wheel, revoluble thereon, of a lever pivoted in said frame, a cutter bar connected with said lever, a shaft carrying a pinion adapted to mesh with said gear wheel, a movable bearing having a lug and carrying said shaft, a foot lever, a member adapted to coact with said lug and move said bearing, a clutch between said foot lever and said bearing controlled by said lever, a chain connected to said lever and said shaft and locking means controlled by said lever for holding said pinion in engagement with said gear wheel.

In testimony whereof I affix my signature in presence of two witnesses.

JOHANN GEORG FAHR.

Witnesses:
PHILIPP GUTMANN,
W. W. SCHMIDT.